United States Patent
Liu et al.

(10) Patent No.: US 9,285,112 B2
(45) Date of Patent: Mar. 15, 2016

(54) METHOD FOR ENERGY STORAGE TO UTILIZE INTERMITTENT RENEWABLE ENERGY AND LOW-VALUE ELECTRICITY FOR $CO_2$ CAPTURE AND UTILIZATION

(71) Applicant: University of Kentucky Research Foundation, Lexington, KY (US)

(72) Inventors: Kunlei Liu, Lexington, KY (US); James Kyle Neathery, Lexington, KY (US); Joseph Eugene Remias, Lexington, KY (US); Cameron Anthony Lippert, Lexington, KY (US); Nick Edward Holubowitch, Lexington, KY (US)

(73) Assignee: UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 115 days.

(21) Appl. No.: 14/166,201

(22) Filed: Jan. 28, 2014

(65) Prior Publication Data

US 2014/0208753 A1    Jul. 31, 2014

Related U.S. Application Data

(60) Provisional application No. 61/757,813, filed on Jan. 29, 2013.

(51) Int. Cl.
*F01K 13/02* (2006.01)
*F22B 1/18* (2006.01)
*F01K 7/40* (2006.01)

(52) U.S. Cl.
CPC .... *F22B 1/18* (2013.01); *F01K 7/40* (2013.01)

(58) Field of Classification Search
CPC .......... F01K 17/00; F01K 17/04; Y02C 10/06
USPC .............................................. 60/652
See application file for complete search history.

(56) References Cited

U.S. PATENT DOCUMENTS

| | | | |
|---|---|---|---|
| 3,912,999 A | 10/1975 | England | |
| 4,287,268 A | 9/1981 | Coetzer | |
| 4,975,345 A | 12/1990 | Coetzer | |
| 5,492,777 A * | 2/1996 | Isenberg et al. | 429/419 |
| 6,093,504 A | 7/2000 | Bliesner | |
| 6,120,933 A | 9/2000 | Phelps | |
| 6,329,098 B1 | 12/2001 | Bliesner | |
| 2012/0077095 A1 | 3/2012 | Roumi et al. | |
| 2012/0247104 A1* | 10/2012 | Handagama et al. | 60/670 |
| 2013/0118909 A1* | 5/2013 | Kaczur et al. | 205/349 |

* cited by examiner

*Primary Examiner* — Audrey K Bradley
(74) *Attorney, Agent, or Firm* — King & Schickli, PLLC

(57) ABSTRACT

A power plant includes a boiler, a steam turbine, a generator driven by that steam turbine, a condenser, a post combustion processing system and an energy storage system including at least one electrochemical cell to store excess electrical energy generated by the generator during period valley demand and release thermal energy for power plant operations at other times.

8 Claims, 8 Drawing Sheets

METHOD FOR ENERGY STORAGE TO UTILIZE INTERMITTENT RENEWABLE ENERGY AND LOW-VALUE ELECTRICITY FOR $CO_2$ CAPTURE AND UTILIZATION

This application claims the benefit of U.S. Provisional Patent Application Ser. No. 61/757,813 filed on Jan. 29, 2013, the full disclosure of which is incorporated herein by reference.

TECHNICAL FIELD

This document relates generally to power plant energy production and more specifically to an apparatus and method for the capture of carbon dioxide produced during energy production by coal-fired power plants.

BACKGROUND

At present, the energy sector is responsible for about three-fourths of the anthropogenic carbon dioxide emissions. Over the past 15 years, economic activity in the U.S. has increased by about 50%; total U.S. electricity demand has increased 30% over the same period. In the coming years, the surge in the U.S. demand for electric power shows no signs of abating. Economic activity in the U.S. is projected to expand 49% by 2020. Accordingly, in the same period, the demand for electricity is projected to increase by another 30%. With this increase in electricity demand, $CO_2$ emissions from more and more power plants will become an even greater driving force in rising atmospheric temperatures.

In general, there are three ways to reduce $CO_2$ emissions from coal-fired power plants: (a) increase overall plant efficiency, (b) co-fire biomass, or (c) capture the carbon released by either pre-, in-situ or post-combustion processes. Due to the nature of human activities, there are double peaks and valleys for electricity consumption daily. Typically, the peak demand will be beyond the base-load power generation capacity and is met by quick-start up, natural gas, simple cycle turbine capacity. The valley demand will be below the base-load and is achieved by unit partial power output. Unfortunately, there is significant efficiency decrease in both period peak and valley demand. Assuming an average base-load plant efficiency of 40% in U.S. fossil fuel-fired generation fleet, one point of plant efficiency change will result in approximately 2.5% $CO_2$ emission increase or decrease at the same gross electricity output. Stated another way, one point of drop in plant efficiency would result in approximately 4 million more tons of $CO_2$ being emitted over the 40 year lifetime of 1 GWe of coal-fired power generation.

Capturing and storing carbon dioxide could slow down climate change and also allow fossil fuels to be a bridge to a clean, renewable energy future. Since the $CO_2$ emitted from electric utilities is the present concern, faster implementation of $CO_2$ capture by chemical means at stationary combustion sources would be highly desirable. While absorption/stripping with aqueous based (such as amine-based solvents) scrubber systems has been successfully used for natural-gas purification, it poses several technical challenges, including the fact that flue gas from utility boilers is at near atmospheric pressure and the concentration of $CO_2$ in the flue gas is relatively low at 12-14%. Another technical hurdle is the energy requirements for the $CO_2$ capture/desorption devices to regenerate absorber reagents. Generally speaking, the energy required for $CO_2$ capture and sequestration using monoethanolamine (MEA) is estimated to reduce a PC plant's output by about 30 percent, which equates to a very substantial 60-80% increase in the cost of electricity. The ability to store energy from a utility grid to allow storing electrical energy during off-peak times and releasing energy to plant for peak time carbon capture will be highly beneficial and will allow a substantial reduction in energy production costs.

SUMMARY

In accordance with the purposes and benefits described herein, a power plant is provided. That power plant comprises: (a) a boiler that receives fuel, feed-water and an air stream to produce steam and a flue gas, (b) a steam turbine that receives the steam to drive a generator to produce electricity and discharges spent steam, (c) a condenser that receives the spent steam and converts the spent steam to condensed feed-water and (d) a post combustion processing system that processes that flue gas. The power plant further includes (e) an energy storage system including at least one electrochemical cell to store excess electrical energy generated by the generator during period valley demand and release thermal energy for power plant operations. In one possible embodiment the post combustion processing system includes a flue gas scrubber, a $CO_2$ absorbent reagent for removing $CO_2$ from the flue gas in the scrubber and a primary stripper for regenerating spent $CO_2$ absorbent reagent.

In accordance with additional aspects, in one possible embodiment the electrochemical cell includes an anode, a cathode, an electrolyte and a heat transfer media. Further, the plant includes a heat exchanger for transferring heat from the heat transfer media to the spent absorbent reagent to aid in regeneration of the spent absorbent reagent. Still further, in one possible embodiment the energy storage system further includes a transformer to step down voltage of the excess electricity and an AC/DC converter to convert the electricity to direct current before adding the electricity to the at least one electrochemical cell. Still further in one possible embodiment the electrochemical cell includes multiple electrochemical cells wired in parallel.

In accordance with yet another aspect, a method is provided for improving power plant operating efficiency. The method comprises the steps: (a) of combusting fuel in an air stream to convert feed-water into steam, (b) driving a steam turbine with that steam and producing electricity, (c) removing $CO_2$ from the flue gas by using a $CO_2$ absorbent reagent, (d) storing excess electricity produced during period valley demand in an electrochemical cell, (e) converting the stored electrical energy to thermal energy and (f) using the thermal energy to aid in regenerating the $CO_2$ absorbent reagent.

These and other embodiments of the power plant and method will be set forth in the description which follows, and in part will become apparent to those of ordinary skill in the art by reference to the following description and referenced drawings.

BRIEF DESCRIPTION OF THE DRAWINGS

The accompanying drawings incorporated herein and forming a part of the specification, illustrate several aspects of the current power plant and together with the description serve to explain certain principles thereof. In the drawings.

Reference will now be made in detail to the present preferred embodiments of the power plant, examples of which are illustrated in the accompanying drawings.

DETAILED DESCRIPTION

Figure 1:
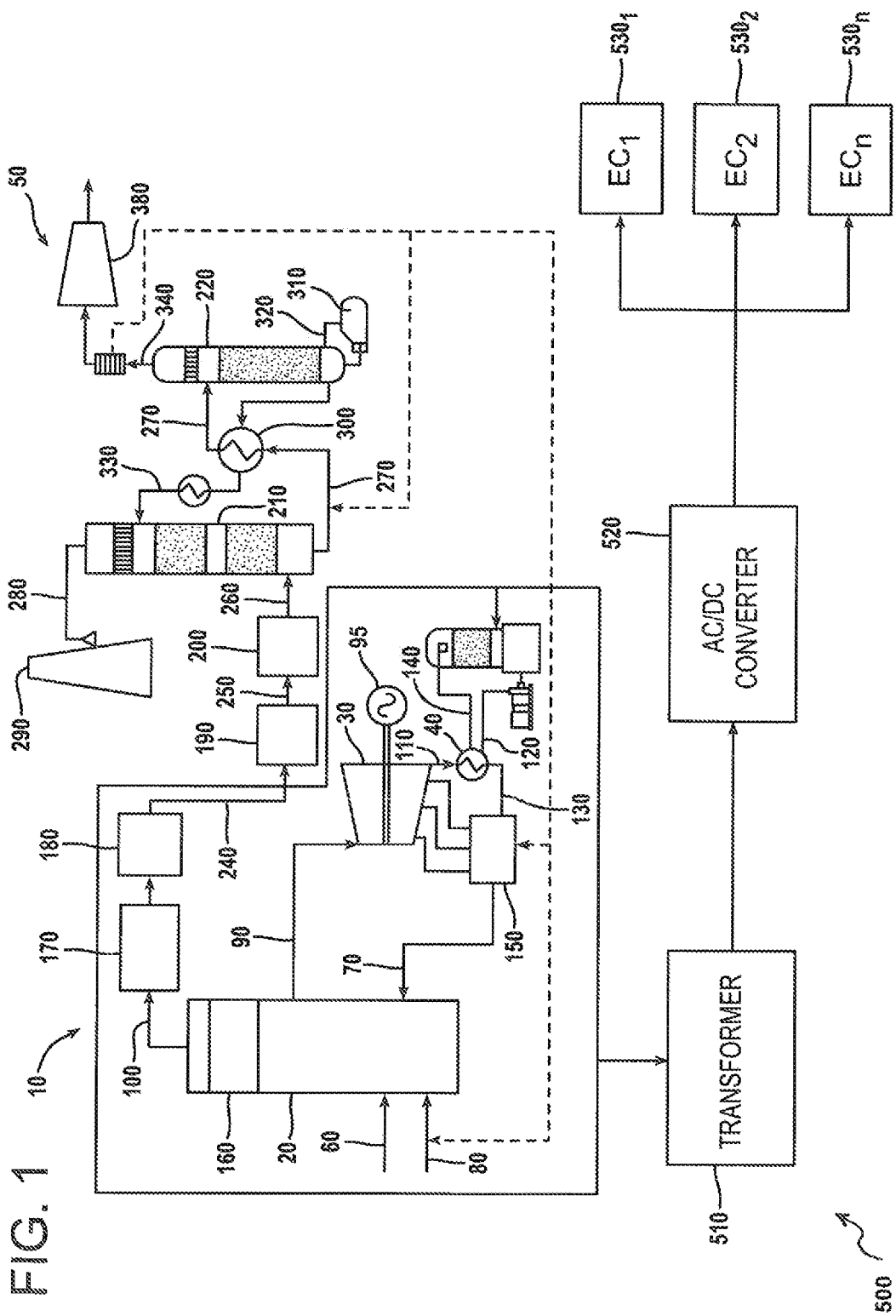
FIG. 1 is a schematical diagram of a coal-fired power plant.

FIG. 1 is a schematic illustration showing an exemplary power plant 10 with improved systems for regenerating absorbent reagent used to remove ($CO_2$) from flue gases. The power plant 10 generally includes a boiler 20, a steam turbine 30, a condenser 40, and a post-combustion processing system 50. The boiler 20 is configured to receive fuel 60, (such as coal, biomass and the like), feed-water 70 and an air stream 80, to combust the fuel 60 thereby vaporizing the feed-water 70 into steam 90, and to discharge a flue gas 100 that includes $CO_2$. The steam turbine 30 is configured to receive the steam 90. The steam 90 drives a load, such as an electric generator 95, and the steam turbine 30 discharges spent steam 110. The condenser 40 is configured to receive the spent steam 110 and a coolant 120, whereupon the spent steam 110 is condensed to form a condensed feed-water 130, and the coolant 120 is warmed to form a warmed coolant 140. The condensed feed-water 130 is heated up via feed water heaters and economizers 150, and subsequently fed back to the boiler 20, thereby completing the steam cycle.

After the fuel/coal 60 is combusted in the boiler 20, flue gas 100 leaves the boiler 20 where it may be treated in a selective catalytic reduction (SCR) reactor 160 to remove $NO_x$. After the SCR reactor 160, the flue gas may be further treated in a particulate matter (PM) control device 170 to remove fly ash. In some embodiments, the PM control device 170 may be an electrostatic precipitator. The flue gas then may travel through one or more flue-gas desulfurization (FGD) devices or $SO_2$ scrubbers 180 to remove $SO_2$, and may enter the post-combustion processing system 50.

The post-combustion processing system 50 may be configured to further process the flue gas, and may include one or more of a direct contact cooler (DCC) 190 for cooling the flue gas with water, a pre-treatment unit or sulfur polishing unit (SPU) tower 200 for polishing flue gas and sulfur containments, a $CO_2$ scrubber 210 and, a primary stripper 220.

After the FGD device 180, the flue gas may enter a forced draft fan, which may boost the pressure of the flue gas to overcome a pressure drop occurring inside the downstream post combustion processing system 50. At this point, the flue gas may be saturated with water at a temperature between about 50-60° C., such as about 55° C. For example, the water content of the flue gas may be between about 15-25% by volume (e.g., about 18% by volume), and the $CO_2$ concentration may be between about 10-20% of the total flue-gas stream (e.g., about 14% of the total flue-gas stream). The pressurized flue gas 240 may proceed through the DCC 190, which is a water spray system with liquid collection at the bottom for recirculation. The DCC 190 may cool and dehumidify the pressurized flue gas 240 to between about 30-40° C. for downstream water management. At this point, the $SO_2$ concentration in the flue gas may be between about 50-70 ppm, (e.g., about 60 ppm). The cooled flue gas 250 then may enter the SPU 200, which is a counter-flow pre-treatment tower. The SPU 200 may use a diluted caustic solution to remove $SO_2$ and other gaseous containments from the cooled flue gas 250, and may polish the cooled flue gas 250 to less than about 10 ppm of $SO_2$, to minimize the formation of heat-stable salts.

The $SO_2$-polished flue gas 260 may enter the $CO_2$ scrubber 210, which may receive the flue gas 260 and may contact the flue gas 260 with a reagent such as monoethanolamine (MEA), 1-amino-2-propanol (1A2P), 3-amino-1-propanol, 2-amino-1-propanol, 2-amino-1-butanol, 3-amino-2-butanol, 2-(methylamino)ethanonol (MAE), 2-(ethylamino) ethanol, morpholine, piperazine (PZ), 1-methylpiperazine (NMP), 2-methylpiperazine, hydroxypiperadine, 2-piperidineethanol, N-aminoethylpierazine (AEP), aminopropylmorpholine, 4-aminopiperidine, 2-amino-2-methyl-1-propanol (AMP), diethanolamine (DEA), glycine, alanine, β-alannine, sarcosine, ethylene diamine (EDA), 1,3-propanediamine, 1,4-butanediamine, 1,5-pentanediamine, 1,6-hexanediamine, methyldiethanolamine (MDEA), triethanolamine (TEA), dimethylethanolamine (DMEA), N,N,N'N'-tetramethyl-1,8-naphthalenediamine, diethylmonoethanolamine, dipropylmonoethanolamine, 1,4-dimethylpiperazine, N N,N',N'-tetramethyl-1,6-hexanediamine, N,N,N',N'-tetrakis(2-hydroxyethyl)ethylenediamine, N,N,N'N''-pentamethyldiethylenetriamine, N,N,N',N'-tetramethylethylenediamine, N,N,N',N'-tetramethylpropane-1, 3-diamine, N,N,N',N'-tetramethylbutane-1,4-diamine, N,N, N'N'-tetramethyl-1,5-pentanediamine, alkali carbonate, and combinations thereof that absorbs $CO_2$ to form a spent absorbent reagent or solution 270 and a $CO_2$-depleted flue gas 280. The $CO_2$-depleted flue gas 280 may be treated in a solvent recovery column or stack 290. At this point, the $CO_2$-depleted flue gas 280 may be saturated with water at a temperature of between about 35-45° C. (e.g., about 40° C.). Meanwhile, the reagent in the $CO_2$ scrubber 210 may absorb $CO_2$ by converting gaseous $CO_2$ into aqueous carbon species, such as by the following reactions [1] and [2]:

$$SC1 + CO_2 \rightarrow SC1-COO^- + H^+ \qquad [1]$$

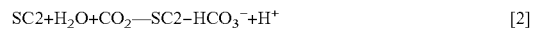

$$SC2 + H_2O + CO_2 \rightarrow SC2-HCO_3^- + H^+ \qquad [2]$$

where SC1 may represent constituents of primary and secondary amines in the solvent or reagent, and SC2 may represent constituents of tertiary amines in the solvent. The spent absorbent reagent 270, rich in carbon, may travel from the bottom of the $CO_2$ scrubber 210 and may be pressurized. Then, the spent absorbent reagent 270 may be sent to a rich-lean solution heat exchanger 300 for sensible heat recovery, before going to the stripper 220 for regeneration.

The stripper 220 may receive the spent absorbent reagent 270 at the top of the unit and may spray the spent absorbent reagent 270 downwardly. A reboiler 310 may be connected to the primary stripper 220. The reboiler 310 may be configured to receive the spent absorbent reagent 270 and vaporize the spent absorbent reagent 270 and water into a reagent steam 320. The reagent steam 320 may be supplied to the bottom of the primary stripper 220. In the packed column of the primary stripper 220, the spent absorbent reagent 270 may travel downwardly and may contact a countercurrent of the reagent steam 320. Upon contacting the reagent steam 320, the spent absorbent reagent 270 may be stripped of at least a portion of the $CO_2$, thereby forming a regenerated reagent or solution 330 that is lean in carbon, such as by the following reactions [3] and [4]:

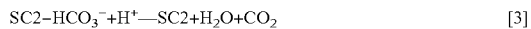

$$SC2-HCO_3^- + H^+ \rightarrow SC2 + H_2O + CO_2 \quad [3]$$

$$SC1-COO^- + H^+ \rightarrow SC1 + CO_2 \quad [4]$$

At the top of the primary stripper 220, a first exhaust vapor 340 consisting of $CO_2$ and water vapor may exit. This first exhaust vapor 340 is directed through the heat recovery unit 350 where it is cooled to condense at least the water vapor therein to form an exhaust solution 370. The exhaust solution 370, enriched in $CO_2$, may be pressurized, intercooled and compressed at a compressor 380 to a pressure of between about 10-20 MPa for downstream utilization or sequestration.

The regenerated absorbent reagent 330 may then exit the stripper 220 at an outlet at the bottom of the unit and may then be sent to the rich-lean solution heat exchanger 300 before being returned to the scrubber 210 to again remove $CO_2$ from the flue gas that is eventually exhausted from the stack 290.

The reboiler 310 may be powered or heated using an energy storage system, generally designated by reference numeral 500, that stores electricity generated by the power plant 10 during period valley demand. More specifically, the energy storage system 500 captures electrons and electricity via electrolysis of a molten salt solution.

The energy storage system 500 includes a transformer 510, an AC/DC converter 520 and a plurality of electrochemical cells $530_1$, $530_2$, $530_n$ wired in series. More specifically, excess electricity generated by the power plant 10 or by intermittent energy source such as wind and solar is first directed to the transformer 510 where it is stepped down in voltage. Next the excess electricity is directed to the converter 520 where the electricity is converted to direct current (DC). This voltage is then added at the minimum needed potential to the series of electrochemical cells $530_1$, $530_2$, $530_n$ wired in parallel.

Figure 2:
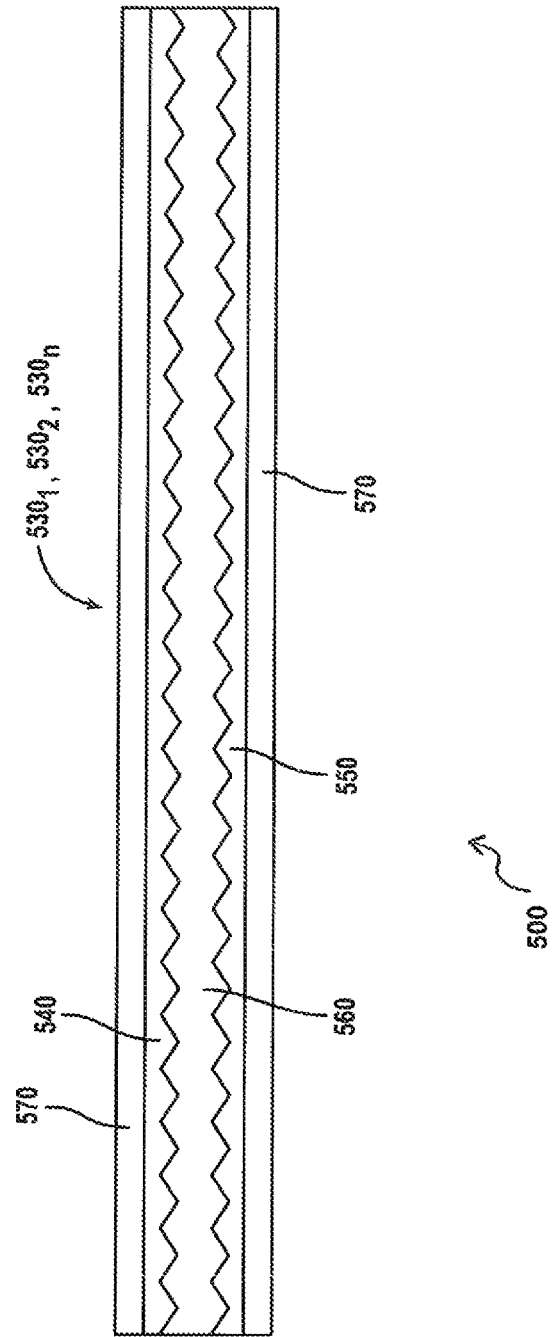
FIG. 2 is a detailed schematical illustration of an electrochemical cell.

As illustrated in FIG. 2, each electrochemical cell $530_1$, $530_2$, $530_n$ includes an anode 540, a cathode 550 and an electrolyte 560 (eg. Li, Cs, K, Ba, Sr, Au, Pt, Ir, Pd, Hg, La, Mg, Mn, Zn, Cu, Ni, Pb Co, Ag, Al, As, Bi, Ca, Cd, Ce, Cr, Fe, Ga, Ge, In, Mo, Na, Nb, Nd, Rb, Re, Ru, Rh, Sc, Se, Si, Sn, Ta, Te, Ti, V, W, Y, Yb, Zr $ZnCl_2$, $ZnCl_2$:KCl, $AlCl_3$:NaCl:KCl, CuCl:KCl, KCl:$SnCl_2$, $ZnCl_2$:NaCl:KCl, LiCl:KCl, $MgCl_2$:NaCl:KCl, NaCl:KCl, $Li_2CO_3$:$Na_2CO_3$:$K_2CO_3$, Molten urea, Ethylene carbonate, Propylene carbonate, Tetraethylene glycol dimethyl ether (TEGDME), Diethylene glycol, tetrabutyl ammonium bromide, 1-ethyl-3-methyl imidazolium tetrafluoroborate, 1-ethyl-3-methyl imidazolium tetrafluoroborate, 1-butylpyridinium chloride, 1-ethyl-3-methyl imidazolium fluoride, tetrakis(acetonitrile) copper(I) bis(trifluoromethylsulfonyl)imide(bistriflimide), or any combination thereof). No salt bridge or membrane is necessary. This greatly simplifies the structure of each cell $530_1$, $530_2$, $530_n$ and reduces costs. A heat transfer media 570 (e.g. $H_2O$ as steam, biphenyl/diphenyl ether eutectic, tetraethylene glycol dimethyl ether, diethylene glycol, propylene carbonate, ethylene carbonate, 1-ethyl-3-methyl imidazolium tetrafluoroborate, 1-ethyl-3-methyl imidazolium tetrafluoroborate, polymerized siloxanes, $CO_2$) passing through the cell $530_1$, $530_2$, $530_n$ may be used to collect thermal energy from the cell for use downstream such as in regenerating absorbent reagent 270.

Without limiting the invention in one possible embodiment, each electrochemical cell may consist of a lead cathode with a carbon (non-reactive) anode. The electrolyte is a $Zn^{+2}$ solution with a counter anion selected to resist oxidation. During a period of excess electricity production the electrochemical cell would have voltage applied in amount sufficient to oxidize the lead ($E°=-0.13$) and reduce the zinc ($E°=-0.76$). Zinc metal would form at the anode. The cell would be maintained in such a way as to keep the solution molten. This could be done by, for example, periodic cycling of the cells to maintain a certain baseline temperature. Once the potential was removed the reaction would spontaneously form $Zn^{+2}$ and lead metal. The cell would need to be designed in such a way that the molten lead would return to the cathode during this process such as by placing the cathode at the bottom of the reactor cell.

While not limiting the scope of the invention, it is believed that the ideal embodiment would be a non-aqueous system. This would prevent the unwanted formation of $H_2$ or $O_2$ gas due to the electrolysis of water. It is believed that the formation of gaseous product in general would not be preferred as it would be necessary to store the high volume gas produced and also reintroduce it to the cell during the energy producing cycle.

One potential example of a non-aqueous system would be a molten salt solution. A molten state is a preferred concept of the invention in order to reduce diffusional limitations of species to the electrode and for the spontaneous electron transfer reactions to occur during the energy regeneration cycle. In order to maintain the cell in a liquid state it would be potentially necessary to apply high temperatures to maintain a molten solution. For example, the temperature for the electrolysis used in aluminum production is between 950-980° C. One way to deal with this would be through the careful selection of metal salt anions. For example, the melting point of zinc chloride (283° C.) is much lower than that of zinc bromide (394° C.). Furthermore, certain additives are known to dramatically reduce melting temperature through formation of deep eutectic salts. Returning to zinc chloride as an example, the freezing point for deep eutectics made from this and an organic salt can be below room temperature. Thus, in one embodiment of the present invention it is proposed that additive be chosen that would help to reduce the molten salt solution temperature. This would increase the efficiency of the system due to heat loss in maintaining the molten salt temperature. Without limiting the invention, the minimum temperature of the system for $CO_2$ solvent regeneration would be at least 140° C.

In selecting the anion salt or additives it will be important to consider the oxidation/reduction potential for the anions. For example at state standard the oxidation potentials for the halide anions increase in the order r (−0.54), Br⁻ (1.1), Cl⁻ (−1.4), F⁻ (−2.9). It is important within the scope of the invention to select an anion sufficiently resistant to oxidation such that it does not participate in the reaction particularly when considering that an overpotential is typically needed to drive the desired reaction. Alternately, an anion could be selected that does not produce a gas when oxidized.

While considering the above, it would be ideal to select oxidation/reduction reactions for the electrolysis that would require a high voltage. This would maximize the amount of energy that could be stored in the reaction. Thus, the capital cost for the cell would be minimized.

In order to increase the speed at which the reaction occurred and minimize the cell size the ideal invention may consist of reactions which remain ionic. For example two transition metals may be selected where the oxidation state change is between +2 to +4 or +1 to +2. This would allow a single phase solution to be present which would reduce the diffusion limitations for the cell when two distinct phases were present (i.e. if a molten metal phase and ionic phase were not miscible).

There are several benefits to the process over existing energy storage methods. First, the system envisioned is simple with no complicated membrane or separator between the electrodes as might be required in a battery. Second, the potential exists for high energy density since energy is stored through a large volume of the cell and, furthermore, there is no diluent aqueous phase allowing high concentrations of reactant. Third, the invention will change the public perception introducing a new method for electricity storage that releases thermal energy (heat) rather than electrons.

Advantageously this apparatus and method reduce energy demand for carbon capture from peak and baseload time in power plant operation. Maintaining the baseload operation during the valley time will significantly increase the electricity generation efficiency which results primarily in energy (fossil fuel) savings and less $CO_2$ emissions for the same amount of electricity production.

EXPERIMENTAL EXAMPLES

Operating Principle

The heat-generating cell (HGC) operates via oxidation-reduction (redox) chemistry of two dissimilar metals transferring between fully reduced (metallic) states and ionic states. Taking the first prototype cell employing zinc and lead metals as an example, each is transferred between its metallic state and +2 oxidation state according to the following reactions:

$$Zn^{2+} + 2e^- \rightleftharpoons Zn^0 \quad E_{red}^° = -0.76V$$

$$Pb^{2+} + 2e^- \rightleftharpoons Pb^0 \quad E_{red}^° = -0.13V$$

where $E_{red}^°$ is the standard reduction potential (versus the standard hydrogen electrode) of the half cell. An ionically conducting electrolyte supports the passing of charge (via ion migration) and solubilizes the dissolving metal ions during operation. For the Zn—Pb cell, the electrolyte is a eutectic molten salt comprised of $ZnCl_2$:KCl in a 1:1 molar ratio with melting point, $T_m$, =230° C. [2] held at a working temperature of 330° C.

There are two phases of cell operation: (i) charge and (ii) discharge. The charging step occurs when excess electrical energy is available from the power plant 10—i.e. during valley demand—to be injected into the energy storage system 500 (FIG. 1). The transformer 510 and AC/DC converter 520 are designed to deliver direct current at a specified potential to the cell during charging. When the cell is charged, it contains stored potential energy which may be released on-demand (discharge) when the reboiler 310 in the post-combustion processing system 50 requires heat for solvent regeneration, e.g. during peak demand.

Depending on cell design, a third heat-generating reaction phase may exist. HGCs may be constructed with or without a separator, depending on redox chemistry. In a cell with no separator, such as Zn—Pb, when Pb ions enter the solvent they may diffuse to the anode at which point a galvanic displacement reaction happens where Pb ions spontaneously exchange electrons with metallic Zn yielding reversible heat (described below). Depolarization of this type of cell is avoided by operation at temperatures above the melting point of Pb. In this case, reduced Pb is in the liquid phase and flows off the anode and back to the molten pool of Pb (cathode). A separator (porous membrane or glass frit) may be used in the cell, in which case galvanic displacement will not occur.

Mechanisms of Heat Generation
Irreversible Heat

The mechanisms of heat generation in HGCs allow for the continual supply of solvent-regenerating thermal energy from the energy storage system 500, independent of consumer electricity demand. Specifically, there are two sources of heat which may be generated by these cells: (i) irreversible heat and (ii) reversible heat.

Irreversible heat is generated whenever current flows through the cell, i.e. during both charging and discharging steps. By nature, it is a physical process independent of the thermodynamic properties of the reagents. Also known as Joule or ohmic heating, irreversible heat is generated via the interaction of flowing current with the cell media, the source of the cell's internal resistance. Irreversible heat, $Q_i$, is proportional to resistance and the square of current $$Q_i \propto I^2 R$$

It must be limited, however, to a certain degree in order to avoid thermal degradation of the cell. It is difficult to select materials to preferentially maximize irreversible heat in an HGC; the ultimate energy output is contingent upon the chemistry and reversible heat of the cell, discussed in the following section. Nevertheless, some considerations may aid in the selection of active materials: larger ions or more viscous electrolytes should increase ohmic resistance; electrode materials selected with moderate electrical conductivities e.g. Mo, W, or Ta should increase heat output; and a solid-state resistor can be used as the external circuit load which is appropriately positioned in order to contribute to the overall HGC heat. However, a careful balance among all variables will be necessary to ensure uniform heating of the HGC; if the cell's internal resistance is too high, current will fail to flow around the electronic circuit.

Reversible Heat

Reversible heat is generated by the chemical reactions occurring in the cell. The overall chemical equation during charging and its thermodynamically reversible potential for one instance of the invention are:

$$Zn^{2+} + Pb^0 \rightleftharpoons Zn^0 + Pb^{2+} \quad E_{cell}^° = -0.63V$$

The magnitude of the $E_{cell}^°$ value is directly proportional to heat available from the chemical reactions occurring in the cell since $$E_{cell}^° = -\frac{\Delta G^°}{nF}$$

where n the number of electrons transferred per mole of metal ion (n=2 in the present case), F is Faraday's constant (96485 C $mol^{-1}$), and $\Delta G°$ (in J $mol^{-1}$) is the standard Gibbs free energy. The latter value is derived from $$\Delta G = \Delta H - T\Delta S$$

where the enthalpy, $\Delta H$ in J $mol^{-1}$, and entropy, $\Delta S$ in J $mol^{-1}$ $K^{-1}$, are thermodynamic values intrinsic to chemical species and they identify the amount of energy in the form of heat released or absorbed during a particular reaction. A decrease in the enthalpy of a reaction (negative $\Delta H$) represents an exothermic process whereby heat is released. A decrease in entropy of a reaction (negative $\Delta S$) represents a release of heat to the environment which, in fact, is desirable in the current cell. Therefore, by consulting tabulated thermodynamic data of various chemical species, two half-cell reactions can be selected to maximize reaction heat output in the cell: the selected overall cell reaction for the discharge step should have both large and negative ΔH and ΔS values. Referring to reactions for the Zn—Pb system above, it can be seen that the optimal combination of enthalpy and entropy values for heat generation are reflected as more negative ΔG values, and therefore more positive $E_{cell}^{\circ}$ values.

Figure 3:
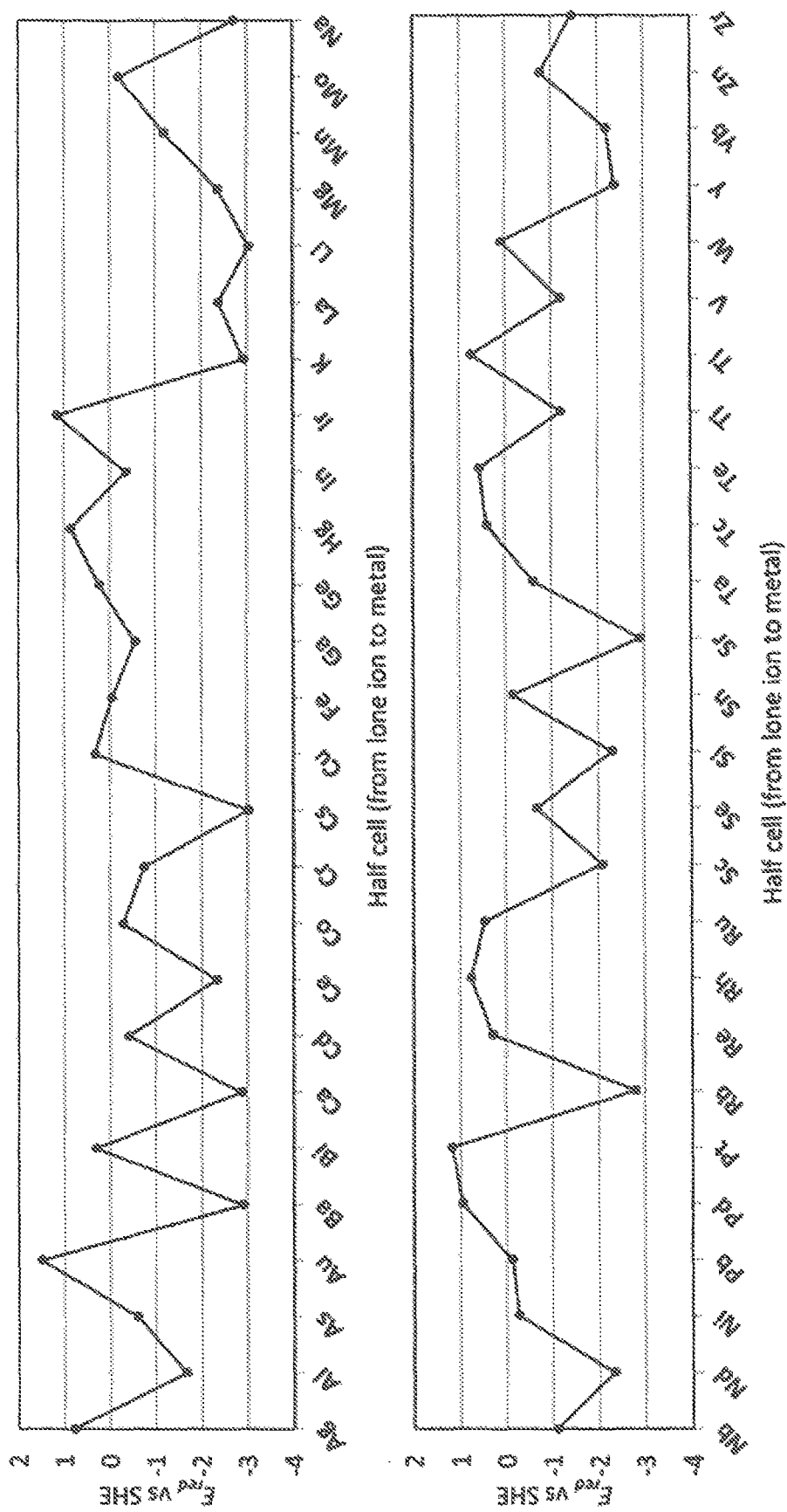
FIG. 3 illustrates standard reduction potentials (V) at 25° C. and 1 atm for candidate redox couples in HGCs.

FIG. 3 presents candidate elements for the active electrodes in HGCs. These half-cells represent the reduction of metal ions (in a commonly encountered oxidation state) to the fully reduced, metallic state, e.g. a phase transition from solubilized ions to solid is involved. The desolvation of a metal ion and its incorporation into a crystal lattice may also be associated with a transfer of heat. When selecting HGC redox couples, the thermodynamic data from FIG. 3 should be considered along with the abundance/cost, safety, and kinetics of electron transfer for each element or compound involved; radioactive elements and excessively rare or expensive elements have been intentionally omitted. Furthermore, the list is by no means exhaustive. There are innumerable other candidates for half-cell reactions such as metal oxide reduction, liquid phase ion-ion reduction e.g. potassium ferro/ferricyanide, solid-solid reduction e.g. in lead acid batteries, and intercalation chemistries involving only one active species, e.g. in Li-ion batteries.

Optimal candidate electrode materials include of any combination of 2 or more of Li, Cs, K, Ba, Sr, Au, Pt, Ir, Pd, Hg, La, Mg, Mn, Zn, Cu, Ni, Pb, and/or Co. In another possible embodiment the electrode materials are selected from any combination of 2 or more of Ag, Al, As, Bi, Ca, Cd, Ce, Cr, Fe, Ga, Ge, In, Mo, Na, Nb, Nd, Rb, Re, Ru, Rh, Sc, Se, Si, Sn, Ta, Tc, Ti, V, W, Y, Yb, and/or Zr.

In an HGC, anode—the electron source during discharge—should be selected with an $E_{cell}^{\circ}$ value more negative than the cathode—the electrode receiving electrons from the external circuit during discharge—so as to maximize heat output. This ensures that the discharge reaction phase is thermodynamically favorable (negative ΔG) and will proceed spontaneously, giving off heat. Specialized solvents are necessary for HGC and should have the following features: compatibility with selected redox couple, i.e. larger electrochemical window than heat-generating redox chemistry, thermal stability in operating range, and should be non-corrosive and stable for long-term operation. Table 1 demonstrates viable solvents which are available for the current invention in the application of carbon capture solvent regeneration based on the above considerations.

TABLE 1

Solvents for HGC.

| Chemical/eutectic/solvent | molar ratio | $T_m$ (° C.) | $T_b$ (° C.) | electrochemical window (ΔV) |
|---|---|---|---|---|
| AlCl$_3$:NaCl:KCl | 66:20:14 | 73 | — | 2.8 |
| CuCl:KCl | 66:34 | 150 | — | TBD |
| KCl:SnCl$_2$ | 52:48 | 176 | — | TBD |
| ZnCl$_2$:KCl | 50:50 | 240 | — | 1.6 |
| ZnCl$_2$:NaCl:KCl | 60:20:20 | 203 | — | TBD |
| LiCl:KCl | 58:42 | 352 | — | TBD |
| MgCl$_2$:NaCl:KCl | 50:30:20 | 396 | — | TBD |
| NaCl:KCl | 50:50 | 657 | — | TBD |
| Li$_2$CO$_3$:Na$_2$CO$_3$:K$_2$CO$_3$ | 32:33:35 | 397 | — | TBD |
| Molten urea | — | 135 | — | TBD |
| Ethylene carbonate | — | 35 | 260 | ~4 |
| Propylene carbonate | — | −50 | 242 | ~4 |
| Tetraethylene glycol dimethyl ether (TEGDME) | — | −30 | 275 | TBD |
| Diethylene glycol | — | −10 | 245 | TBD |

The electrolyte material used in the electrochemical cell could be, but not limited to, any combination of material in Table 1.

Carbon Capture-Specific Considerations

HGCs will need to raise the temperature of steam to around 140° C. in order to regenerate carbon capture solvents. Considering the necessarily indirect nature of the heat transfer steps involved (conduction to steam in contact with the cell), it is estimated that HGCs will need to achieve internal temperatures of around 200° C. This, along with the likelihood that selected $E_{cell}^{\circ}$ values will be greater than 1.23 V, the electrochemical window for water stability, precludes the use of aqueous solvents. The solvents and electrolytes are thus limited to ionic liquids (e.g. molten salts) and high-boiling point organic solvents.

Experimental Data

Two functioning bench-scale prototypes have demonstrated the heat-generating capability of the electrochemical cells described herein.

Example 1

Zn—Pb—Cell

Materials

Zn metal, Pb metal, ZnCl$_2$, and KCl were obtained from Sigma-Aldrich and used as-received. Due to the high working temperature of this cell, an aluminum block (approx. 20×10× 10 cm) was machined with a well in the center to house the cell vessel (a cylindrical glass vial approx. 20 mm diameter and 50 mm tall). When inserted into the block, the top of the vial was flush with the block's surface and the gap between the vial's sidewalls and the block was ≤2 mm. The block was positioned directly on a ceramic hotplate turned to its maximum temperature (hotplate reading 520° C.) in order to achieve a molten salt temperature around 330° C. A thermostat was not used so that the hotplate did not readjust its temperature to account for heat generated by the HGC. The thermal fluctuation of the molten salt, stabilized by the Al block, was confirmed to ≤±1° C. by an Omega HH85 thermometer employing a K-type thermocouple.

To prepare the 1:1 molar molten salt eutectic, appropriate masses of KCl and ZnCl$_2$ powders were mixed in a glove box with air and water content <0.1 ppm due to the deliquescence of ZnCl$_2$. The salts were fused to 330° C. in the vial described above under ambient atmosphere.

The anode consisted of a Zn foil (30×10×1 mm) suspended in the molten salt while the anode was lead metal (in a molten state at these temperatures) at the base of the vial where the exposed surface area was roughly equivalent to that of the anode. A graphite rod (50×10×2 mm) was positioned vertically in the cell to make electrical contact to the molten Pb.

Electrochemical Characterization

A CH Instruments 604B potentiostat was used to control charge and discharge potentials and for investigating electrochemical windows using Bulk Electrolysis with Coulometry and Cyclic Voltammetry (CV) techniques, respectively.

Data

Zn—Pb Heat Output

Figure 4A:
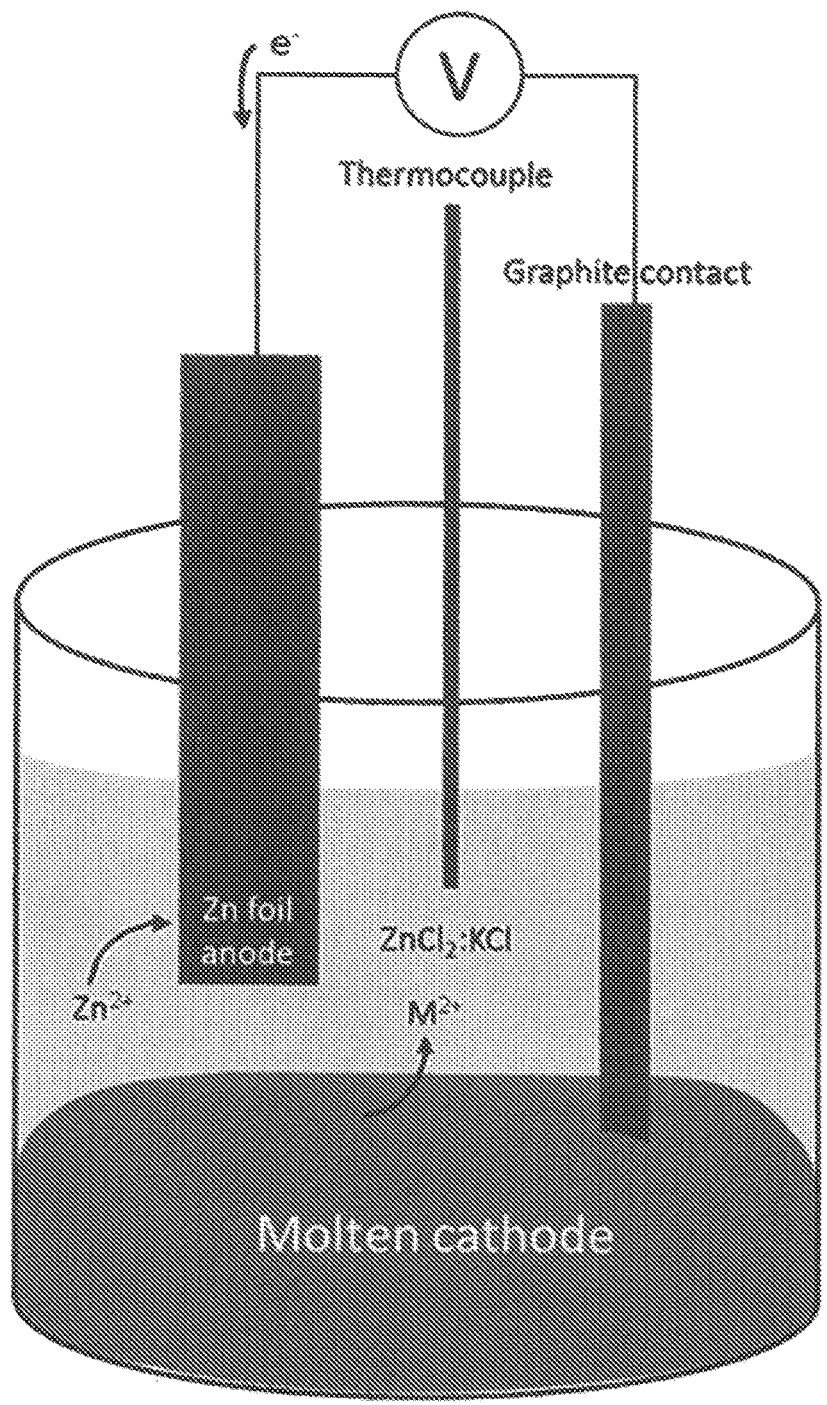
FIGS. 4a and 4b illustrate respective charge and discharge steps with heat generation.
Figure 4B:
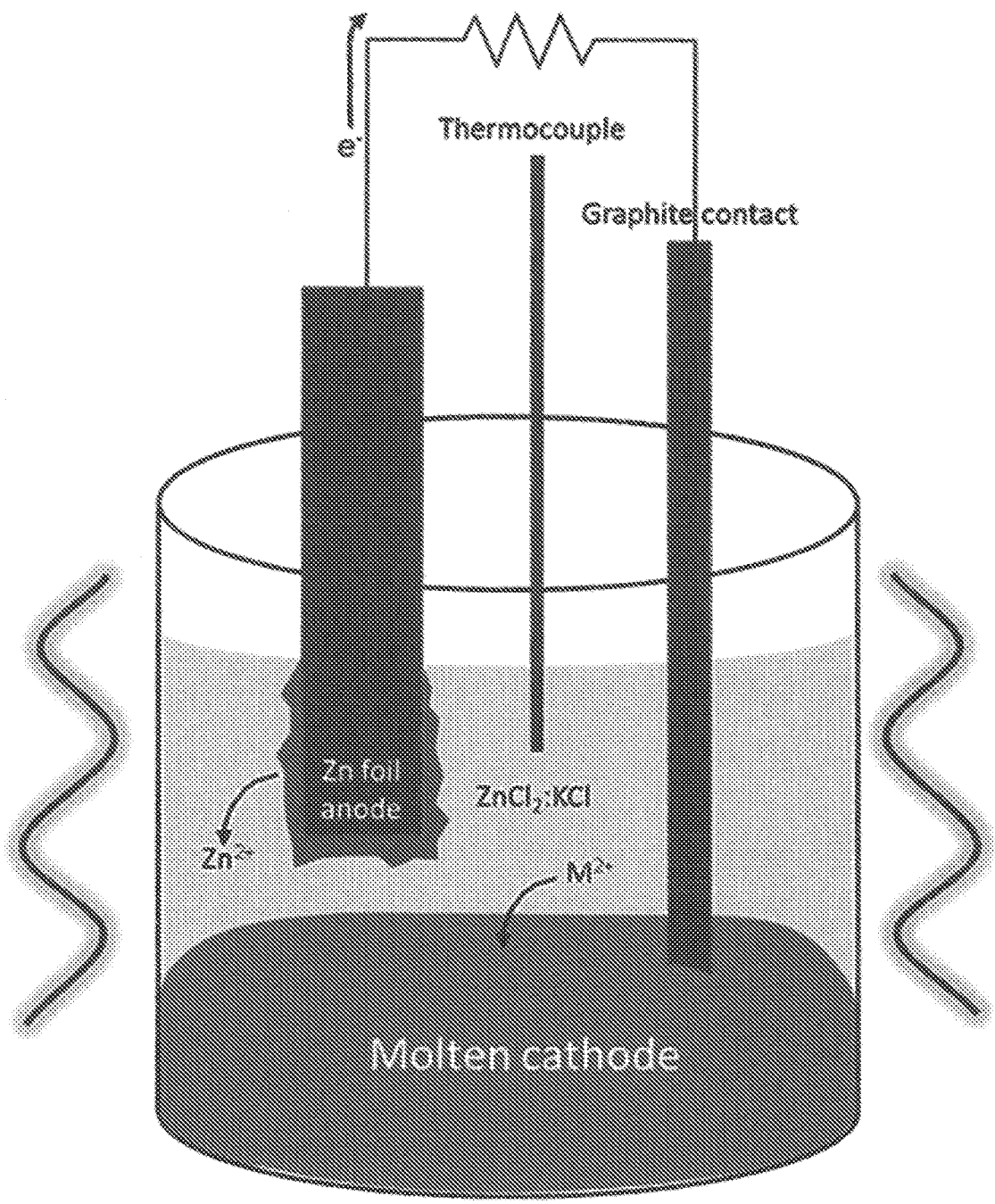
Figure 5A:
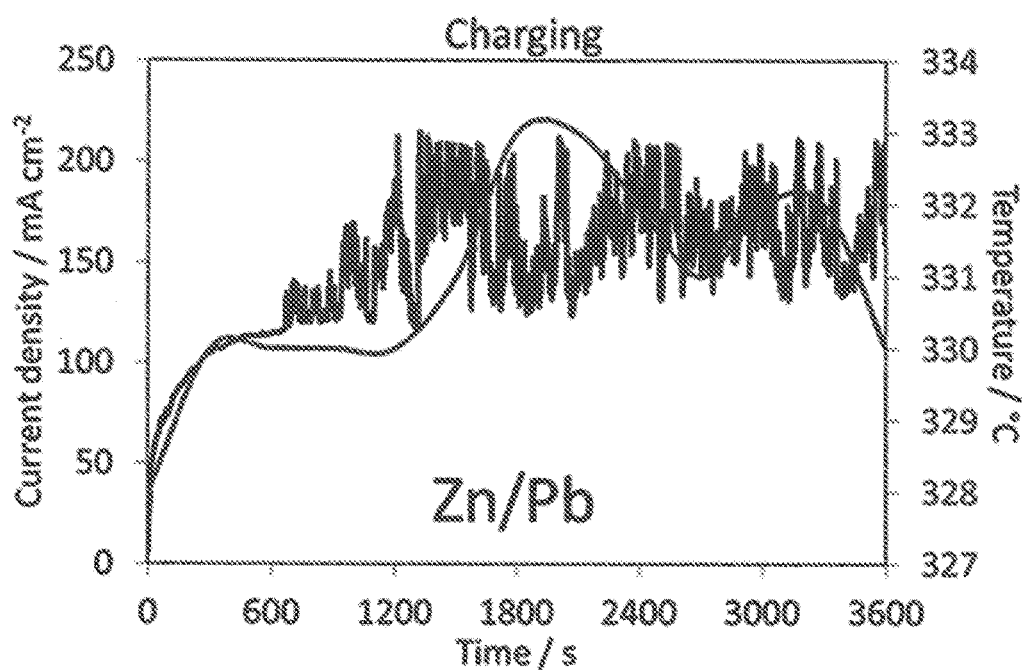
FIG. 5a illustrates charge data for the Zn/Pb HGC at a constant applied potential (−0.8V) for one hour with corresponding temperature data on the secondary axis.
Figure 5B:
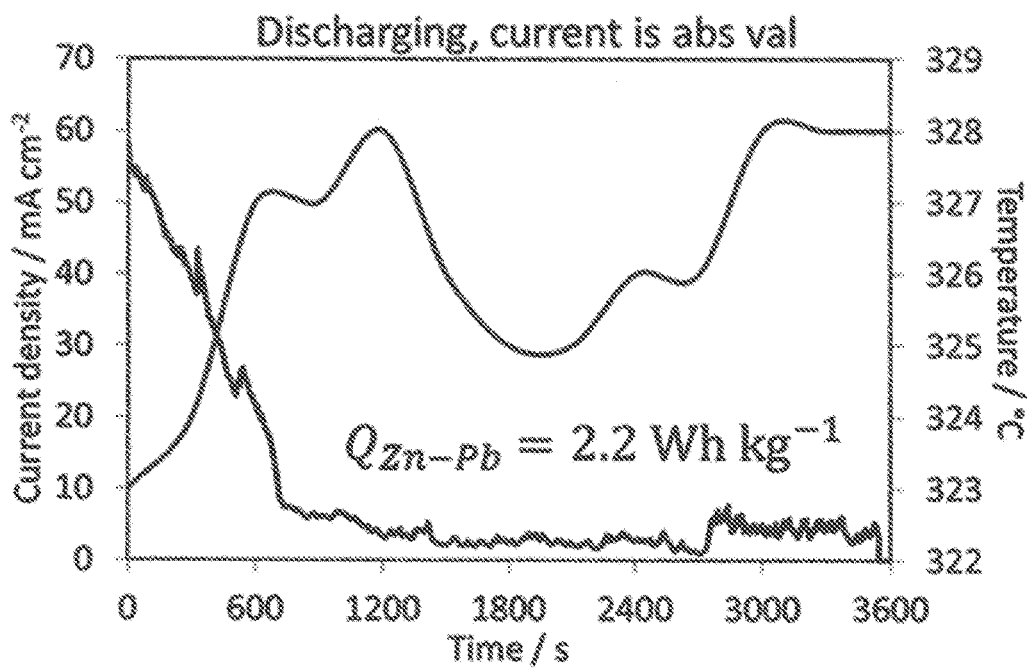
FIG. 5b illustrates discharge data for the same system at a constant 0.0 V. In both cases, Zn foil is the working electrode of the two electrode set up with Pb as the counter and reference electrode.

The cell was charged via a two-electrode setup with Zn as working electrode and Pb as counter and reference electrodes. A constant potential of −0.8 V was applied to the cell while monitoring over one hour to charge the cell by dissolving $Pb^{2+}$ ions into solution and depositing metallic Zn onto the Zn foil (FIG. 4a). The current and temperature data, monitored during charge, are shown in FIG. 5a. Discharge was subsequently performed at 0.0 V as shown in FIG. 5b.

Analysis

The selected charging potential is somewhat arbitrary and different potentials or constant current may be used instead in the energy storage system 500. The −0.8 V used here gave currents easily measured by the instrumentation. Discharge was performed by "applying" a potential of 0.0 V across the cell which allows it to deliver currents only limited by the cell's internal resistance, thereby ostensibly maximizing heat generation.

Heat increases (ΔT) of 2° C. and 5° C. (secondary axes in FIG. 5) were associated with the charge and discharge steps, respectively. This experimentally confirms the behavior expected from the heat-generating mechanisms detailed above: the charging phase yields irreversible heat which is slightly cooled by the endothermic/non-spontaneous chemical reactions being driven by excess electricity in the power plant, and is thus lower in magnitude than the heat generated during discharge where irreversible and reversible heats are combined.

A calculation of the representative heat output can then be performed using $$Q = C_p m \Delta T$$

where Q is the heat generated by the cell (J), $C_p$ is the heat capacity (J kg$^{-1}$ K$^{-1}$), m is the mass and ΔT is the difference between initial and final temperature (K) [3].

For this cell the specific energy was determined to be 2.2 Wh kg$^{-1}$ for the discharge phase. The heat capacity of molten $ZnCl_2$:KCl heat capacity was assumed to be similar to that of a molten salt from the literature (1550 J kg$^{-1}$ K$^{-1}$ for 60-wt. % $NaNO_3$ and 40-wt. % $KNO_3$). Also, we have only considered the mass of electrolyte for this calculation, as the project target specified (75 Wh kg$^{-1}$) is based on that mass. Heat generated (Q in J) is converted to Wh and normalized by electrolyte mass for the output calculation. While quantitative heat measurements are usually obtained via calorimetry, the above method of solvent temperature monitoring should provide an early diagnostic test for the HGC's heat-generating viability.

Figure 6:
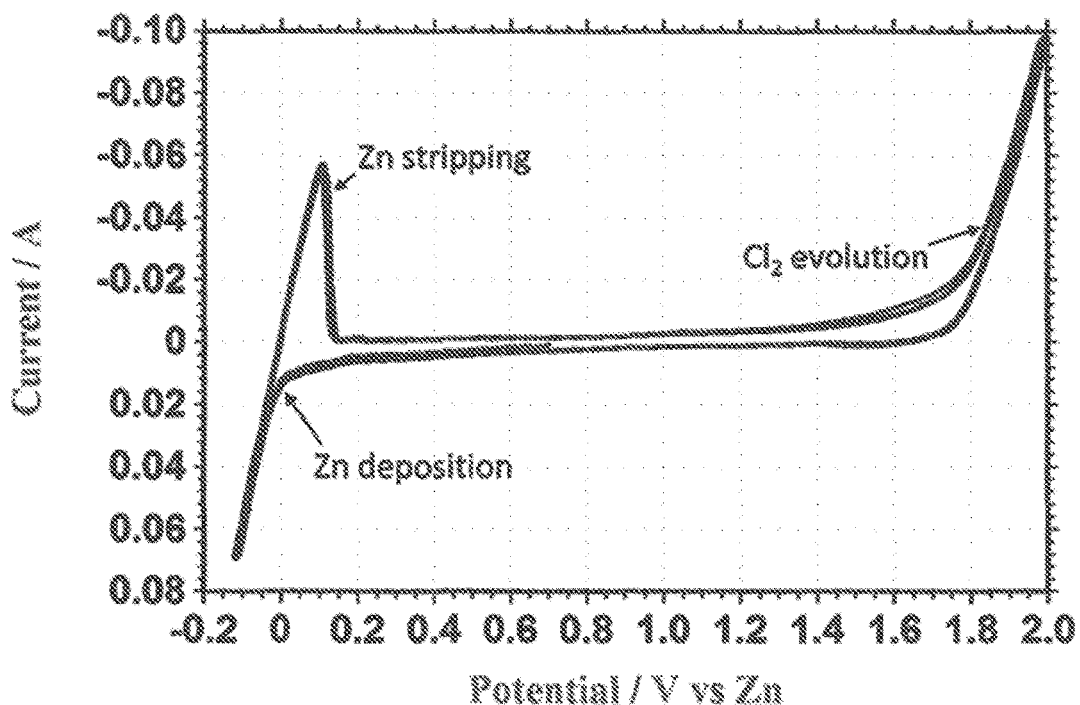
FIG. 6 illustrates the CV of Zn HGC in $ZnCl_2$:KCl with Zn foil reference and counter electrodes and graphite working electrode at a scan rate of 50 $mVs^{-1}$. The potential was initially scanned in the cathodic direction from the OCV of 0.7V.

Aside from providing an active species ($Zn^{2+}$) for heat-generating redox chemistry, the $ZnCl_2$:KCl eutectic salt is a potentially viable "solvent" and supporting electrolyte for other combinations of redox couples (see FIG. 3) and this is confirmed by CV demonstrating its wide electrochemical window (~1.8 V) in FIG. 6.

Example 2

Al Electrodeposition Cell

A second embodiment of the invention, based on the electrodeposition and stripping of Al, is described below. This system offers a lower working temperature and demonstrates a larger heat output.

Materials and Experimental Setup

Al foil, $AlCl_3$, NaCl and KCl were obtained from Sigma-Aldrich and used as-received. Appropriate masses of $AlCl_3$, NaCl, and KCl for the molten salt eutectic $AlCl_3$:NaCl:KCl at 50:36:14 molar proportions ($T_m$=73° C.) [5] were fused in a beaker at 160° C. (a typical working temperature) under nitrogen until a homogeneous liquid resulted. The thermal fluctuation of the molten salt, stabilized by an oil bath, was confirmed to ≤±1° C. A three-electrode setup consisted of a graphite rod (50×10×2 mm) working electrode and Al foils (30×10×0.5 mm) as reference and counter electrodes.

Data and Analysis

Figure 7:
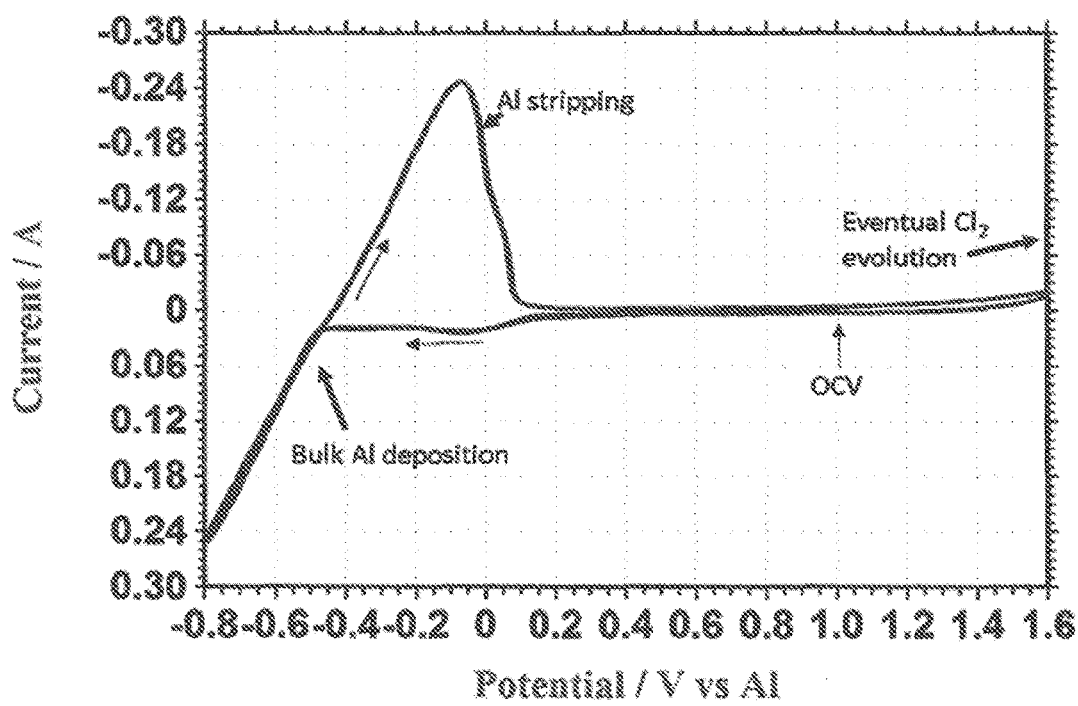
FIG. 7 illustrates the CV of Al HGC in $AlCl_3$:NaCl:KCl with Al foil reference and counter electrodes at a scan rate of 50 $mVs^{-1}$. The potential was initially scanned in the cathodic direction from the OCV of 1V.

Cyclic voltammetry (CV) was first investigated in the Al cell to determine the electrochemical window of the eutectic for its potential application as an electrolyte for HGCs. The OCV of this cell lied at about 1 V and FIG. 7 demonstrates that bulk Al electrodeposition occurs below −0.5 V vs Al. This indicates that an overpotential (either kinetic or ohmic or a combination thereof) of about −0.5 V exists in order to electrodeposit Al. It is this potential that can be exploited to generate heat in the current configuration since both half-cells are Al/$Al^{3+}$ couples (theoretical $E_{cell}$=0 V). The electrochemical window of this electrolyte showed a ΔV of about 2.2 V.

Figure 8A:
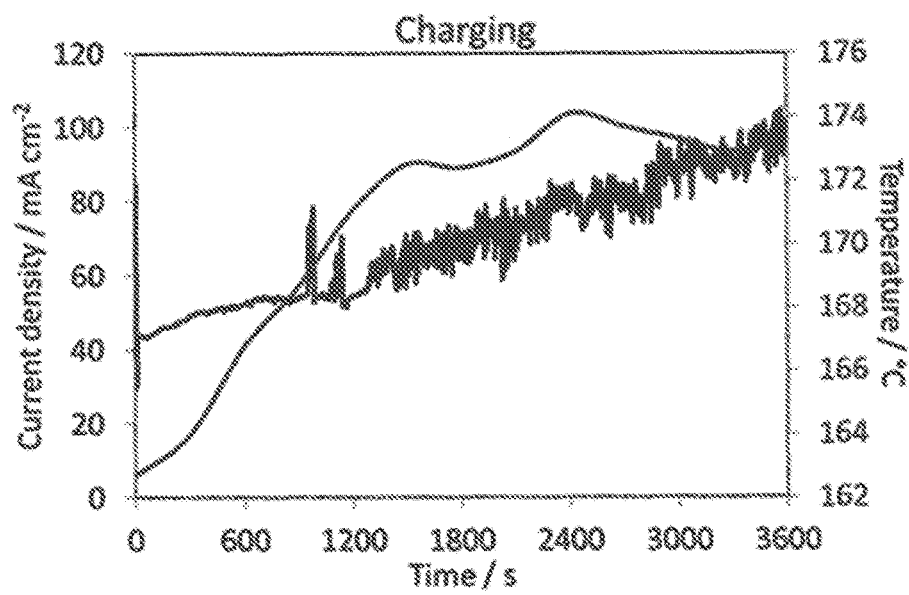
FIGS. 8a and 8b are respective charge and discharge data for Al HGC with charge performed at −0.8V and discharge at 1.0V.
Figure 8B:
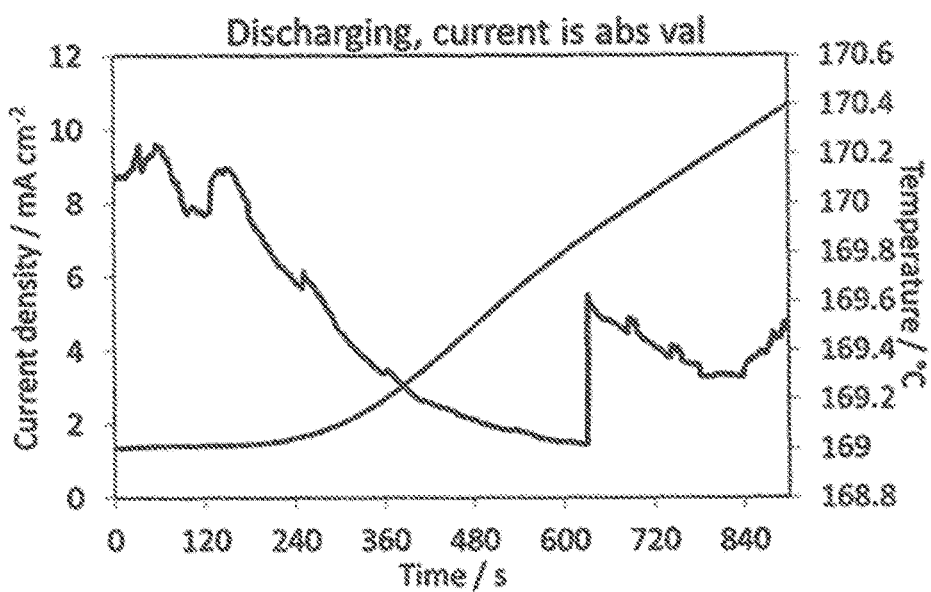

The charging step (deposition of Al onto graphite) was performed for 1 h at −0.8 V, a potential well negative of initiation of bulk deposition, and the associated temperature and current data are presented in FIG. 8 (a). Temperature rise correlated well with deposition current, as expected, with a ΔT of 11° C. This value is significantly larger than that observed for the Zn—Pb system which is additionally operated at much higher temperatures. The subsequent discharge data (FIG. 8 (b)) display a smaller ΔT than expected based on the charging step but system optimization is currently underway.

Example 3

La-Based Cell

The abundance of La (higher ppm by weight than Li in the earth's crust) and its large negative $E_{red}$ render it an attractive material for HGCs. Furthermore, the large size of the $La^{3+}$ ion could add to irreversible ohmic heat. La's large and negative half-cell potential ($E_{red}$=−2.38 V) suits it ideally for HGC anodes when coupled with a less negative and inexpensive cathode metal such as Pb or Zn

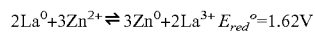

$$2La^0 + 3Zn^{2+} \rightleftharpoons 3Zn^0 + 2La^{3+} \quad E_{red}^\circ = 1.62V$$

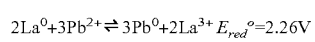

$$2La^0 + 3Pb^{2+} \rightleftharpoons 3Pb^0 + 2La^{3+} \quad E_{red}^\circ = 2.26V$$

And many other half-cells are suitable with La, as seen in FIG. 3 above. La metal is air-sensitive but starting with a fully discharged cell (e.g. $LaCl_3$ dissolved in the solvent with metallic Zn or Pb cathode), allows for easier handling of materials and HGC functionality commences after cell charging, where the deposited La metal is protected by the molten salt or organic electrolyte.

The La-based bench-scale cell utilizes a high surface area reticulated vitreous carbon electrode which serves as the substrate for La deposition. The high surface area electrode allows for more current to be produced and thus yields higher temperatures, mainly from reversible heat. Thus, the temperature of steam can be raised more efficiently as it passes over the cell vessel en route to regenerating carbon capture solvents.

Procedure

Materials

LaCl₃, Zn metal, ZnCl₂, and tetraethylene glycol dimethyl ether (TEGDME) are obtained from Sigma-Aldrich and used as-received. The substrate for La deposition, a reticulated vitreous carbon (RVC) electrode, is a cylinder 50 mm high, 40 mm diameter, and 5 mm thick (reported surface area=10.5 $cm^2/cm^2$) and is obtained from BASi (Bioanalytical Systems, Inc.). TEGDME is selected to demonstrate a third solvent's applicability to the invention. A glass tube (10 cm long, 2 cm diameter) which is open at one end and fitted with a fine porosity glass frit at the other end serves as the compartment for housing the Zn foil cathode.

Experimental Setup

An appropriate amount of LaCl₃ is dissolved in TEGDME in a beaker at room temperature in a glove box with air and water content <0.1 ppm. Under ambient conditions, the RVC electrode is submerged in the beaker and the glass tube is lowered into the beaker, in the gap at the center of the RVC. The tube is then filled with solvent and the Zn foil cathode is positioned in the tube. The cell is then brought to the desired operating temperature by submerging in an oil bath on a hotplate.

The cell is now ready for use and must first be charged by applying an appropriate potential across the cell in a two-electrode setup with the RVC as the working electrode and Zn foil as counter and reference electrodes. When the cell is fully charged, it can be held at open circuit until heat needs to be delivered, e.g. to raise the temperature of steam passing over the cell. To deliver the heat, a load of appropriate resistance is connected to the external circuit to allow current to flow through the cell which generates heat. The cell is rechargeable and the charge/discharge cycle is repeated as necessary based on carbon capture solvent requirements and electricity demand.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A power plant, comprising:
    a boiler that receives fuel, feed-water and an airstream to produce steam and a flue gas;
    a steam turbine that receives said steam to drive a generator to produce electricity and discharges spent steam;
    a condenser that receives said spent steam and converts said spent steam to condensed feed water;
    a post combustion processing system that processes said flue gas comprising a flue gas scrubber, a $CO_2$ absorbent reagent for removing $CO_2$ from said flue gas in said scrubber and a primary stripper for regenerating spent $CO_2$ absorbent reagent; and
    an energy storage system comprising at least one electrochemical cell to store excess electrical energy generated by said generator during period valley demand and release thermal energy for power plant operations, the at least one electrochemical cell comprising an anode, a cathode, an electrolyte a heat transfer media and a heat exchanger for transferring heat from said heat transfer media to said spent absorbent reagent to aid in regeneration of said spent absorbent reagent.

2. The plant of claim 1 wherein said electrolyte is selected from a group of materials consisting of $ZnCl_2$, $ZnCl_2$:KCl, $AlCl_3$:NaCl:KCl, CuCl:KCl, KCl:$SnCl_2$, $ZnCl_2$:NaCl:KCl, LiCl:KCl, $MgCl_2$:NaCl:KCl, NaCl:KCl, $Li_2CO_3$:$Na_2CO_3$:$K_2CO_3$, molten urea, ethylene carbonate, propylene carbonate, tetraethylene glycol dimethyl ether (TEGDME), diethylene glycol, tetrabutyl ammonium bromide, 1-ethyl-3-methyl imidazolium tetrafluoroborate, 1-ethyl-3-methyl imidazolium tetrafluoroborate, 1-butylpyridinium chloride, 1-ethyl-3-methyl imidazolium fluoride, tetrakis(acetonitrile) copper (I) bis(trifluoromethylsulfonyl)imide(bistriflimide), and combinations thereof.

3. The plant of claim 1 wherein said heat transfer media is selected from a group of materials consisting of $H_2O$ as steam, biphenyl/diphenyl ether eutectic, tetraethylene glycol dimethyl ether, diethylene glycol, propylene carbonate, ethylene carbonate, 1-ethyl-3-methyl imidazolium tetrafluoroborate, 1-ethyl-3-methyl imidazolium tetrafluoroborate, polymerized siloxanes, $CO_2$ and combinations thereof.

4. The plant of claim 1, wherein said anode and said cathode are selected from any combination of at least two materials selected from a group consisting of Li, Cs, K, Ba, Sr, Au, Pt, Ir, Pd, Hg, La, Mg, Mn, Zn, Cu, Ni, Pb and Co.

5. The plant of claim 1, wherein said anode and said cathode are selected from any combination of at least two materials selected from a group consisting of Ag, Al, As, Bi, Ca, Cd, Ce, Cr, Fe, Ga, Ge, In, Mo, Na, Nb, Nd, Rb, Re, Ru, Rh, Sc, Se, Si, Sn, Ta, Te, Ti, V, W, Y, Yb and Zr.

6. The plant of claim 1, said energy storage system further comprising a transformer to step down voltage of said excess electricity and an AC/DC converter to convert said electricity to direct current before adding said electricity to said at least one electrochemical cell.

7. The plant of claim 6, wherein said at east one electrochemical cell includes multiple electrochemical cells wired in parallel.

8. A method of improving power plant operating efficiency, comprising:
    combusting fuel in an air stream to convert feed-water into steam;
    driving a steam turbine with said steam and producing electricity;
    removing $CO_2$, from flue gas produced by combusting said fuel, using a $CO_2$ absorbent reagent;
    storing excess electricity produced during period valley demand in an electrochemical cell;
    converting said stored electrical energy to thermal energy; and
    using said thermal energy to aid in regenerating said $CO_2$ absorbent reagent.

* * * * *